(12) United States Patent
Noh et al.

(10) Patent No.: US 11,178,326 B2
(45) Date of Patent: Nov. 16, 2021

(54) IMAGE SENSOR AND ELECTRONIC DEVICE INCLUDING IMAGE SENSOR

(71) Applicant: SAMSUNG ELECTRONICS CO., LTD., Suwon-si (KR)

(72) Inventors: Yohwan Noh, Jeongeuo-si (KR); Daekwan Kim, Suwon-si (KR); Chaesung Kim, Seoul (KR); Tae-Shick Wang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/786,572

(22) Filed: Feb. 10, 2020

(65) Prior Publication Data
US 2020/0404185 A1   Dec. 24, 2020

(30) Foreign Application Priority Data

Jun. 19, 2019 (KR) .......................... 10-2019-0073066

(51) Int. Cl.
| | | |
|---|---|---|
| H04N 5/232 | (2006.01) | |
| H04N 5/225 | (2006.01) | |
| H04N 5/369 | (2011.01) | |
| H04N 9/04 | (2006.01) | |
| H04N 9/07 | (2006.01) | |
| H01L 27/146 | (2006.01) | |
| G02B 7/36 | (2021.01) | |

(52) U.S. Cl.
CPC ..... *H04N 5/232122* (2018.08); *H04N 5/2254* (2013.01)

(58) Field of Classification Search
CPC ............ H04N 5/23212; H04N 5/2254; H04N 5/2257; H04N 5/369; H04N 5/3696; H04N 5/374; H04N 9/077; H04N 5/232122; H04N 5/36961; H04N 9/045; G02B 7/36; G02B 7/365; H01L 27/14605; H01L 27/14621; H01L 27/14627; H01L 27/14634; H01L 27/14623; H01L 27/14645; H01L 27/14607; H01L 31/0232; H01L 27/14643
USPC .......... 348/349, 345, 340, 208.12, 335, 326, 348/806; 257/98, 72, 291, 292, 294, 432, 257/435, 293; 438/70; 359/11, 279, 619, 359/319, 383, 410; 250/226, 201.2, 250/201.4, 231.16
See application file for complete search history.

(56) References Cited

U.S. PATENT DOCUMENTS

| | | | | |
|---|---|---|---|---|
| 6,638,786 B2 * | 10/2003 | Yamamoto | .............. | H01L 21/00 438/57 |
| 7,427,742 B2 * | 9/2008 | Drawley | .................. | H01J 3/14 250/216 |
| 7,847,852 B2 * | 12/2010 | Kuruyama | ............. | G02B 13/16 348/335 |

(Continued)

FOREIGN PATENT DOCUMENTS

| | | |
|---|---|---|
| JP | 2014-219545 A | 11/2014 |
| JP | 2015-138263 A | 7/2015 |
| KR | 10-2018-0059842 A | 6/2018 |

*Primary Examiner* — Marly S Camargo
(74) *Attorney, Agent, or Firm* — Sughrue Mion, PLLC

(57) ABSTRACT

Provided is an image sensor including a pixel array including a plurality of pixels, and a micro lens array including a first micro lens of a first size provided in a first area of the pixel array and a second micro lens of a second size provided in a second area of the pixel array, the second size being different from the first size.

16 Claims, 12 Drawing Sheets

(56) References Cited

U.S. PATENT DOCUMENTS

| | | | |
|---|---|---|---|
| 8,102,460 B2* | 1/2012 | Awazu | H04N 5/225 |
| | | | 348/340 |
| 8,269,861 B2 | 9/2012 | Aragaki | |
| 8,274,586 B2* | 9/2012 | Katsuno | H04N 5/335 |
| | | | 348/335 |
| 8,345,144 B1 | 1/2013 | Georgiev et al. | |
| 9,445,018 B2 | 9/2016 | Fettig et al. | |
| 9,654,681 B2* | 5/2017 | Seo | H04N 5/23212 |
| 9,686,462 B2 | 6/2017 | Hirota | |
| 9,768,217 B2* | 9/2017 | Kawabata | H04N 5/225 |
| 10,044,959 B2* | 8/2018 | Gluskin | H04N 5/369 |
| 10,819,929 B2* | 10/2020 | Jung | H04N 5/369 |
| 2015/0156400 A1* | 6/2015 | Seo | H04N 5/23212 |
| | | | 348/353 |
| 2015/0381951 A1* | 12/2015 | Mlinar | H04N 9/04 |
| | | | 348/294 |
| 2016/0227085 A1 | 8/2016 | Xu et al. | |
| 2017/0090149 A1 | 3/2017 | Galor Gluskin et al. | |
| 2019/0052823 A1* | 2/2019 | Jung | H04N 5/3696 |

* cited by examiner

IMAGE SENSOR AND ELECTRONIC DEVICE INCLUDING IMAGE SENSOR

CROSS-REFERENCE TO THE RELATED APPLICATION

This application claims priority from Korean Patent Application No. 10-2019-0073066 filed on Jun. 19, 2019, in the Korean Intellectual Property Office, the disclosure of which is incorporated herein by reference in its entirety.

BACKGROUND

1. Field

Example embodiments of the present disclosure relate to an electronic device, and more particularly, to an image sensor and an electronic device including the image sensor.

2. Description of the Related Art

An image sensor included in a smartphone, a tablet personal computer (PC), or a digital camera obtains image information about an external object by converting a light reflected from the external object into an electrical signal. An autofocus (AF) may be performed to improve the quality of image of the external object. For faster autofocus, an image sensor that supports a phase detection autofocus (PDAF) may be used.

The image sensor that supports the PDAF may receive an incident light for each angle. The autofocus performance may be higher when angles of incident lights received are clearly separated. However, angles of incident lights may not be separated depending on locations of pixels of the image sensor. In particular, angles of lights incident onto pixels present in a peripheral portion (or an outer portion) of the image sensor may not be separated. As such, the autofocus performance of the peripheral portion of the image sensor may be lower than the autofocus performance of a central portion (or an inner portion) of the image sensor.

SUMMARY

One or more example embodiments provide an image sensor that is able to improve an autofocus performance of a peripheral portion of the image sensor while supporting a phase detection autofocus, and an electronic device including the image sensor.

According to an aspect of an example embodiment, there is provided an image sensor including a pixel array including a plurality of pixels, and a micro lens array including a first micro lens of a first size provided in a first area of the pixel array and a second micro lens of a second size provided in a second area of the pixel array, the second size being different from the first size.

According to another aspect of an example embodiment, there is provided an image sensor including a micro lens array including a first micro lens having a first diameter and a second micro lens having a second diameter that is different from the first diameter, and a sub-pixel array including a first sub-pixel group configured to convert a first light signal transmitted through the first micro lens into a first electrical signal and a second sub-pixel group configured to convert a second light signal transmitted through the second micro lens into a second electrical signal.

According to another aspect of an example embodiment, there is provided an electronic device including a module lens configured to receive a first light incident at a first angle that is refracted from an external object and a second light incident at a second angle that is refracted from the object, an image sensor configured to generate first image data corresponding to the object based on the first light transmitted through the module lens and to generate second image data corresponding to the object based on the second light transmitted through the module lens, and an image signal processor configured to generate a control signal to adjust a location of the module lens based on the first image data and the second image data, wherein the image sensor includes micro lenses of different sizes configured to receive the first light and the second light.

BRIEF DESCRIPTION OF THE DRAWINGS

The above and/or other objects and will become apparent by describing in detail example embodiments thereof with reference to the accompanying drawings, of which.

DETAILED DESCRIPTION

Figure 1:
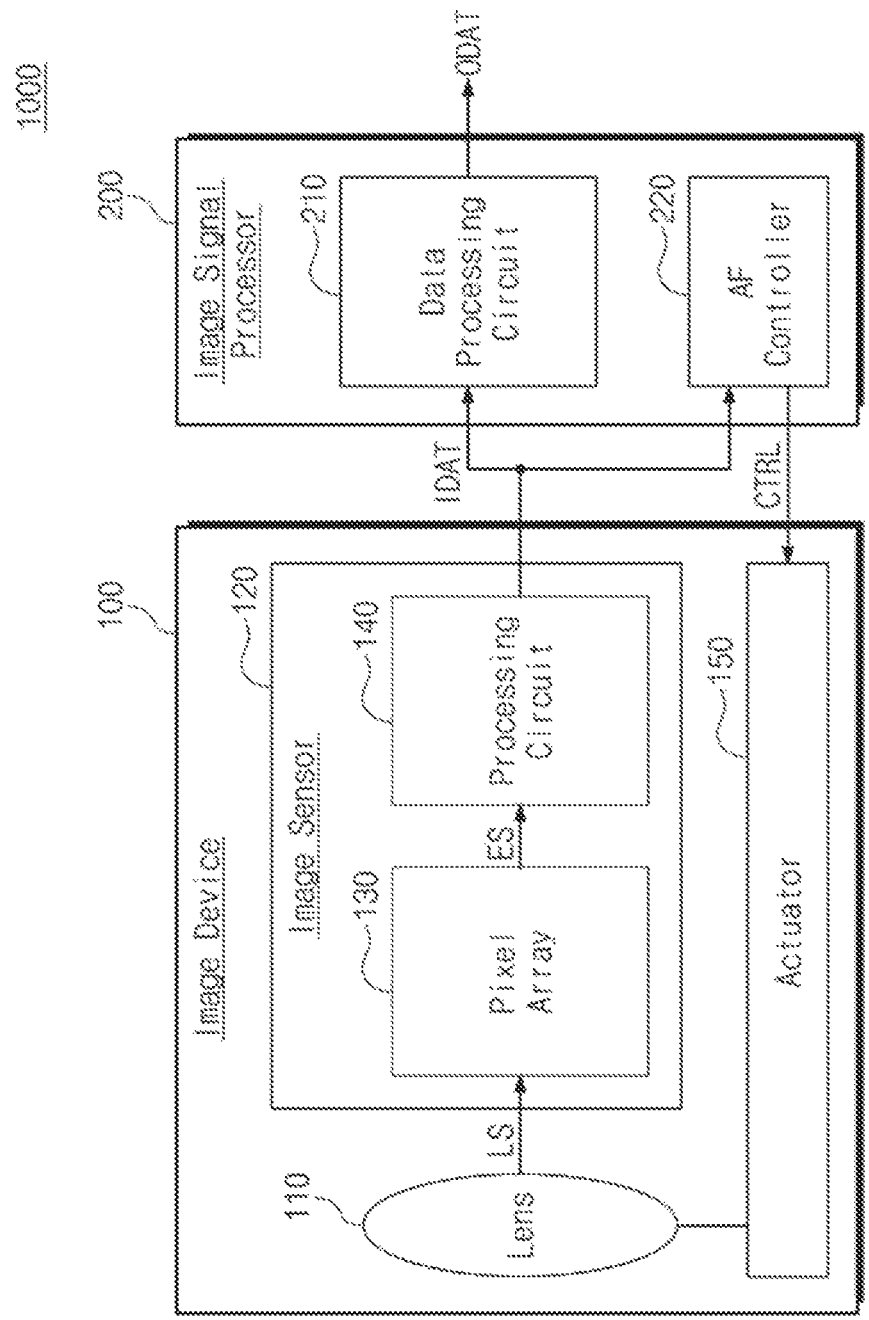
FIG. 1 is a block diagram illustrating an image system according to an example embodiment.

FIG. 1 is a block diagram illustrating an image system according to an example embodiment. Referring to FIG. 1, an image system 1000 includes an image device 100 and an image signal processor (ISP) 200. For example, the image system 1000 may be one of various electronic devices, which are able to obtain image information about an object from the outside, such as a smartphone, a tablet PC, and a digital camera.

The image device 100 may include a lens 110, an image sensor 120, and an actuator 150. The image sensor 120 may include a pixel array 130 and a processing circuit 140.

The lens 110 may receive a light LS that is incident after being reflected from an external object. The lens 110 may concentrate the received light signal LS on the pixel array 130. The lens 110 may move based on an operation of the actuator 150. When a location of the lens 110 varies depending on the movement of the lens 110, a focal distance of the lens 110 may change to get an object in focus. For example, the actuator 150 may be an autofocus motor. For example, the lens 110 may be a module lens or a main lens.

The pixel array 130 may include a plurality of pixels. The light LS transmitted to the pixel array 130 through the lens 110 may be converted into an electrical signal ES through a photoelectric conversion element. The electrical signal ES output from the pixel array 130 may be provided to the processing circuit 140.

The processing circuit 140 may convert the electrical signal ES being an analog signal into a digital signal, and may output an image data IDAT that is a digital signal. The processing circuit 140 may perform various signal processing operations as well as an analog-to-digital conversion operation. For example, the processing circuit 140 may perform a correlated double sampling (CDS) operation for extracting a more effective signal component.

The processing circuit 140 may output the image data IDAT generated by performing various signal processing operations on the electrical signal ES. The output image data IDAT may be provided to the image signal processor 200.

A data processing circuit 210 may process the image data IDAT to generate output image ODAT. For example, the data processing circuit 210 may perform various data processing operations on the image data IDAT, such as lens shading correction, white balance correction, noise reduction, sharpening, gamma correction, and color conversion. The output image ODAT may be provided to a separate processor or a display device.

An autofocus (AF) controller 220 may detect a phase difference between the lights LS incident onto each of the plurality of pixels in the pixel array 130 and may generate a control signal CTRL for autofocus by using the detected phase difference.

For example, the autofocus controller 220 may calculate a disparity based on the image data IDAT of the object targeted for the autofocus. The disparity indicates a coordinate difference of two image data IDAT obtained with respect to the object. For example, the autofocus controller 220 may compare a left image data IDAT and a right image data IDAT obtained from the object to calculate a disparity. The autofocus controller 220 may determine a movement distance of the lens 110 for the autofocus based on the calculated disparity. The autofocus controller 220 may generate the control signal CTRL such that the lens 110 moves to a location corresponding to the determined movement distance. The generated control signal CTRL may be provided to the actuator 150. In this case, the actuator 150 may move the lens 110 to the corresponding location in response to the control signal CTRL.

According to an example embodiment, the autofocus may be performed based on a way to detect phase differences in various regions of an image photographed through the lens 110. For example, the autofocus may be performed on a central (or inner) region of the image, or the autofocus may be performed on a peripheral (or outer) region of the image. That is, according to an example embodiment, the autofocus may be performed based on a method to detect phase differences in the entire region of the image. Accordingly, the sharpness of the peripheral region as well as the central region of the image may be improved, and it may be possible to more quickly focus the peripheral region.

A structure of the image sensor 120 that supports a phase detection autofocus in various regions of an image will be described with reference to FIGS. 2 to 8.

Figure 2:
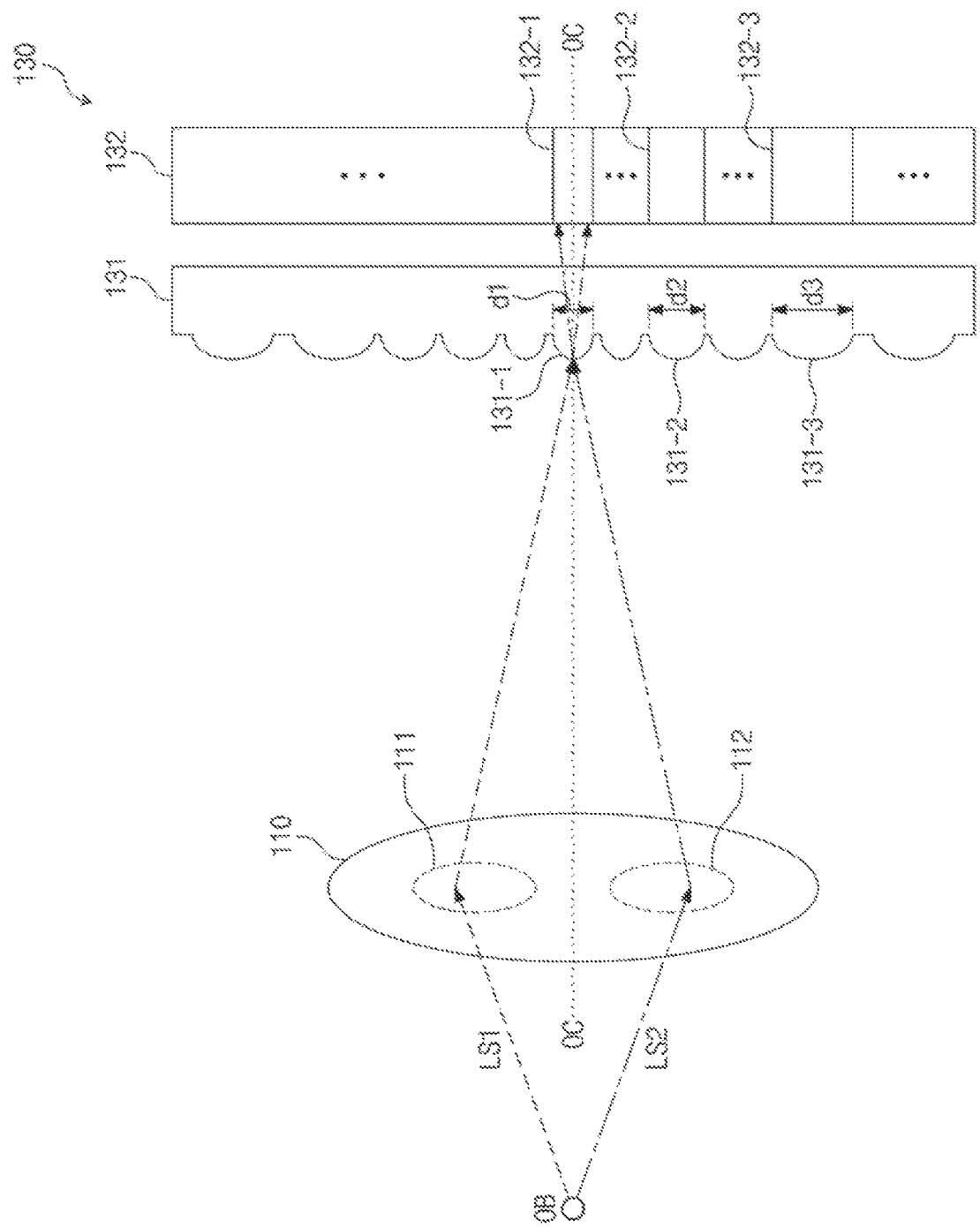
FIG. 2 is a diagram for describing a pixel array according to an example embodiment.

FIG. 2 is a diagram for describing a pixel array according to an embodiment. Referring to FIG. 2, the pixel array 130 may include a micro lens array 131 and a sub-pixel array 132. The sub-pixel array 132 may include a plurality of sub-pixel groups. For example, the sub-pixel array 132 may include a first sub-pixel group 132-1, a second sub-pixel group 132_2, and a third sub-pixel group 132-3. A sub-pixel group may include at least one sub-pixel, and the sub-pixel may include at least one photoelectric conversion element.

One micro lens in the micro lens array 131 may correspond to one sub-pixel group in the sub-pixel array 132. For example, the first micro lens 131-1, the second micro lens 132-1, and the third micro lens 131-3 may correspond to the first sub-pixel group 132-1, the second sub-pixel group 132_2, and the third sub-pixel group 132-3, respectively. A sub-pixel group may receive a light transmitted through a corresponding micro lens, but embodiments are not limited thereto.

The micro lens array 131 may include micro lenses of different sizes. For example, the micro lens array 131 may include the first micro lens 131-1 having a first diameter d1, the second micro lens 131-2 having a second diameter d2, and the third micro lens 131-3 having a third diameter d3. According to an example embodiment, the diameter d1 of the first micro lens 131-1 may be smaller than the diameter d2 of the second micro lens 131-2. The diameter d2 of the second micro lens 131-2 may be smaller than the diameter d3 of the third micro lens 131-3. However, embodiments are not limited thereto.

In an example embodiment, the size of a micro lens may be determined based on a modulation transfer function (MTF) of the lens 110. Here, the MTF that is an index for evaluating a performance of the lens 110 may be associated with a resolving power and a contrast. For example, the size of a micro lens in a central (or inner) portion of the pixel array 130 where the MTF is high may be smaller than the size of a micro lens in a peripheral (or outer) portion of the pixel array 130 where the MTF is low. In this case, as a distance from an optical center OC of the lens 110 increases, the size of the micro lens may become larger, but embodiments are not limited thereto.

Sub-pixel groups corresponding to micro lenses of different sizes may include different numbers of sub-pixels. For example, the number of sub-pixels of the first sub-pixel group 132-1 may be less than the number of sub-pixels of the second sub-pixel group 132-2. The number of sub-pixels of the second sub-pixel group 132-2 may be less than the number of sub-pixels of the third sub-pixel group 132-3. As sub-pixels may be formed to have the same size, the number of sub-pixels of a sub-pixel group may be proportional to the size of the corresponding micro lens.

As illustrated in FIG. 2, the lens 110 may receive first light LS1 and the second lights LS1 and LS2 reflected by an object OB. The first light LS1 may be received through a pupil 111 of the lens 110, and the second light LS2 may be received through a pupil 112 of the lens 110. The first light LS1 may include image information of the object OB collected in a first direction (a direction where the pupil 111 is placed), and the second light LS2 may include image information of the object OB collected in a second direction (a direction where the pupil 112 is placed). When the lens 110 is not focused on the object OB, a phase of the first light LS1 may be different from a phase of the second light LS2.

The first light LS1 and the second light LS2 may be refracted through the lens 110 and may be transmitted to the first micro lens 131-1 of the pixel array 130, which corresponds to a location of the object OB. The first light LS1 and the second light LS2 incident onto the first micro lens 131-1 may be refracted through the first micro lens 131-1 and may be transmitted to the first sub-pixel group 132-1 corresponding to the first micro lens 131-1. The first light LS1 and the second light LS2 incident onto the first micro lens 131-1 may be separated depending on the incident angles and may be incident onto the first sub-pixel group 132-1. For example, the first light LS1 may be incident onto a first sub-pixel of the first sub-pixel group 132-1, and the second light LS2 may be incident onto a second sub-pixel of the first sub-pixel group 132-1. The first light LS1 may be incident onto a first photoelectric conversion element of the first sub-pixel group 132-1, and the second light LS2 may be incident onto a second photoelectric conversion element of the first sub-pixel group 132-1.

As such, when the first light LS1 and the second light LS2 are separated and received depending on incident angles, image data of the object OB viewed in different directions may be generated. In this case, a disparity may be calculated based on the image data thus generated, and the phase detection autofocus may be performed on the object OB based on the calculated disparity.

Similar to the first micro lens 131-1 and the first sub-pixel group 132-1, another micro lens and a corresponding sub-pixel group may separately receive lights incident at different angles. In this case, a disparity may be calculated based on image data generated from the lights, and the phase detection autofocus may be performed on an image region corresponding to the sub-pixel group based on the calculated disparity. For example, the third micro lens 131-3 and the third sub-pixel group 132-3 may separately receive lights incident at different angles. In this case, a disparity may be calculated based on image data generated from the lights, and the phase detection autofocus may be performed on an image region corresponding to the third sub-pixel group 132-3 based on the calculated disparity.

As such, according to the pixel array 130, the phase detection autofocus may be performed on all of the image regions corresponding to the whole of the pixel array 130.

As illustrated in FIG. 2, when the sizes of micro lenses of the micro lens array 131 are different, the autofocus performance of the whole of the pixel array 130 may be improved. As the size of a micro lens becomes larger, the number of sub-pixels increases, and thus, incident angles of incident lights may be more finely separated. At the central portion of the pixel array 130, in which the MTF 15 high, although the incident angles of lights are less separated compared to the peripheral portion of the pixel array 130, the autofocus performance may be improved. As such, a relatively small micro lens may be provided in the central portion of the pixel array 130 for the purpose of implementing a high resolution. When incident angles of lights are not clearly separated in the peripheral portion of the pixel array 130, in which the MTF 15 low, the autofocus performance may be reduced. As such, a larger micro lens may be provided in the peripheral portion of the pixel array 130 than the central portion of the pixel array 130 to autofocus the image. In this example, incident angles of lights may be clearly separated in the peripheral portion of the pixel array 130, the autofocus performance may be improved.

Figure 3:
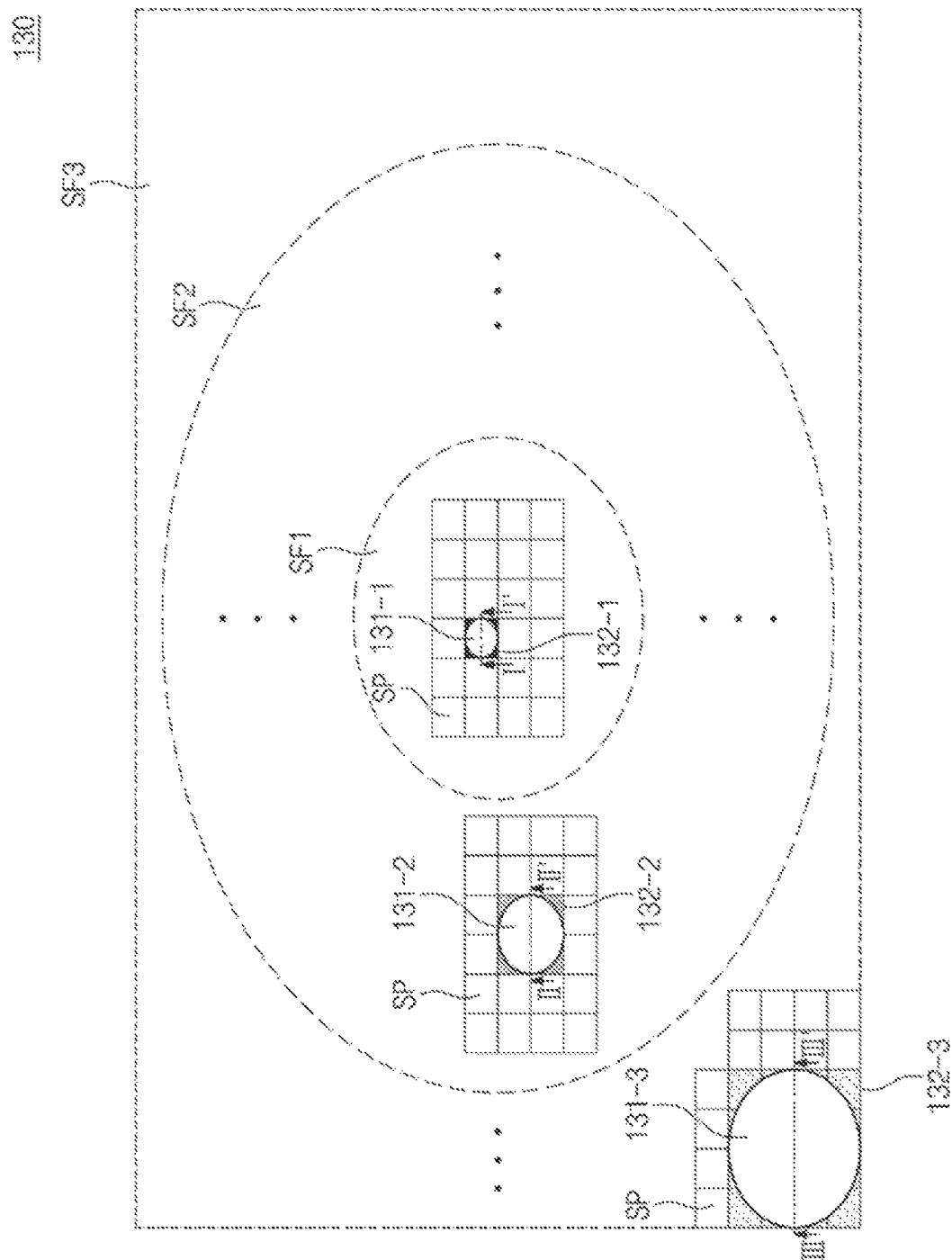
FIG. 3 illustrates an example structure of a pixel array of FIG. 2.

FIG. 3 illustrates an example structure of a pixel array of FIG. 2. Referring to FIG. 3, the pixel array 130 may include sub-pixels SP of the same size. Each of the sub-pixels SP may include at least one photoelectric conversion element. Each of the sub-pixels SP may be used to detect an image and may also be used to detect a phase difference for the autofocus.

The pixel array 130 (or the image sensor 120) may be divided into a first field, SF1, a second field SF2, and a third field SF3. For example, the first field SF1, the second field SF2, and the third field SF3 may be divided depending on the MTF of the lens 110. A method to divide the pixel array 130 into the first field SF1, the second field SF2, and the third field SF3 depending on the MTF of the lens 110 will be more fully described with reference to FIG. 4.

Figure 4:
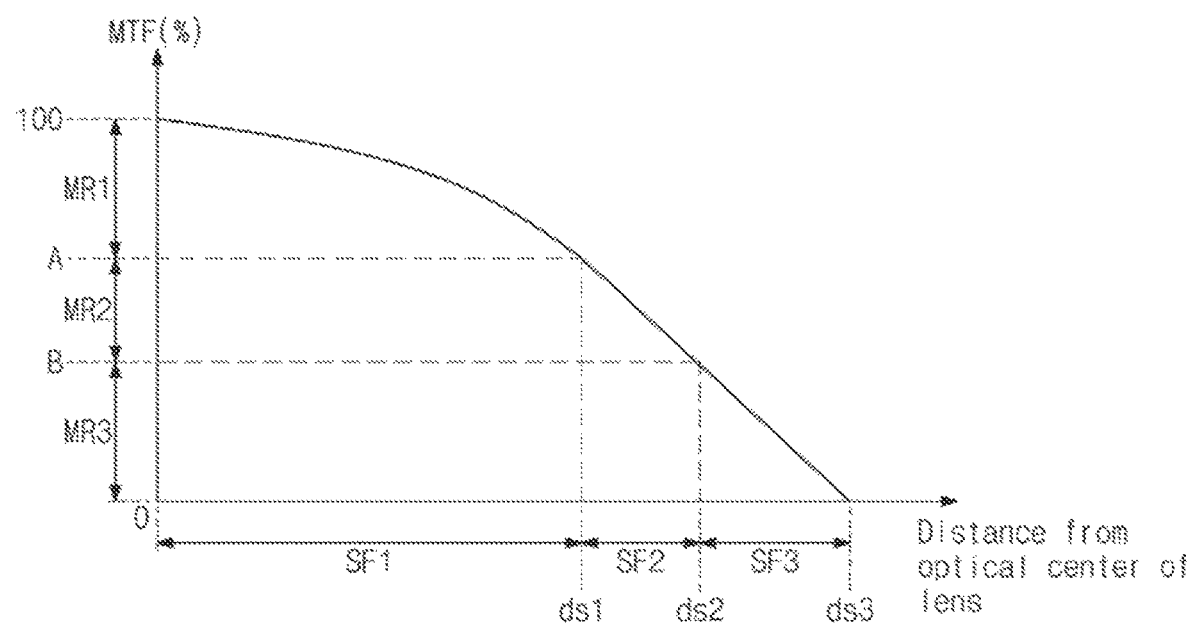
FIG. 4 is a graph illustrating an example of a modulation transfer function (MTF) of a lens of FIG. 2.

FIG. 4 is a graph illustrating an example of an MTF of a lens of FIG. 2. In FIG. 4, a horizontal axis represents a distance from an optical center OC, and a vertical axis represents an MTF.

When the pixel array 130 is divided into the first field SF1, the second field SF2, and the third field SF3, the first field SF1 may be a region corresponding to a first MTF range MR1. The first MTF range MR1 may indicate an MTF that is 100% or less and exceeds A %. For example, the first field SF1 may correspond to an MTF that is 100% or less and exceeds 50%. According to the MTF of FIG. 4, the first field SF1 may be a region from the optical center OC to the first distance ds1.

The second field SF2 may be a region corresponding to a second MTF range MR2. The second MTF range MR2 may indicate an MTF that is A % or less and exceeds B %. For example, the second field SF2 may correspond to an MTF that is 50% or less and exceeds 10%. According to the MTF of FIG. 4, the second field SF2 may be a region that is the first distance ds1 or longer and is shorter than the second distance ds2, with respect to the optical center OC.

The third field SF3 may be a region corresponding to the third MTF range MR3. The third MTF range MR3 may indicate an MTF that is B % or less. For example, the third field SF3 may correspond to an MTF that is 10% or less. According to the MTF of FIG. 4, the third field SF3 may be a region that is the second distance ds2 or longer and is shorter than the third distance ds3, with respect to the optical center OC.

According to the MTF of FIG. 4, as a distance from the optical center OC increases, the MTF may decrease, but embodiments are not limited thereto. For example, unlike the example illustrated in FIG. 4, an MTF of a region that is distant from the optical center OC may be greater than an MTF of a region that is close to the optical center OC.

Referring to FIG. 3, the size of a micro lens to be disposed may vary depending on fields of the pixel array 130. The first micro lens 131-1 of the first field SF1 may correspond to the first sub-pixel group 132-1 including one sub-pixel SP (i.e., a 1×1 sub-pixel SP). In this case, the size of the first micro lens 131-1 may be the same as the size of one sub-pixel SP.

As described above, the pixel array 130 may be divided into a plurality of fields, and the sizes of micro lenses provided in different fields may be different. Here, a field may indicate a region of the pixel array 130, which is classified based on the MTF of the lens 110. However, embodiments are not limited thereto. For example, the field may indicate a region of the pixel array 130, which is classified depending on a distance from the optical center of the lens 110 or the center of the pixel array 130.

As illustrated in FIG. 4, because the MTF of the first field SF1 is relatively high, lights incident onto the first micro lens 131-1 may be clearly separated depending on angles and may be converged on one sub-pixel SP. In this case, the accuracy of a disparity that is calculated based on the image data IDAT generated from one sub-pixel SP may be relatively high. Accordingly, the autofocus performance may be high in the first field SF1.

The second micro lens 131-2 of the second field SF2 may correspond to the second sub-pixel group 132-2 including 4 sub-pixels SP (i.e., 2×2 sub-pixels SP). In this case, the size of the second micro lens 131-2 may be the same as the size of the 2×2 sub-pixels SP.

The third micro lens 131-3 of the third field SF3 may correspond to the third sub-pixel group 132-3 including 16 sub-pixels SP (i.e., 4×4 sub-pixels SP). In this case, the size of the third micro lens 131-3 may be the same as the size of the 4×4 sub-pixels SP.

As illustrated in FIG. 4, the MTF of the second field SF2 and the third field SF3 may be relatively low. However, because the number of sub-pixels corresponding to the second micro lens 131-2 and the third micro lens 131-3 are greater than the number of sub-pixels corresponding to the first micro lens 131_1, lights incident onto the second micro lens 131-2 and the third micro lens 131-3 may be clearly separated depending on angles and may be converged on sub-pixels SP. In this case, a disparity may be calculated based on the image data IDAT generated from various sub-pixels SP, and the accuracy of the calculation of the disparity may be higher. Accordingly, the autofocus performance may be improved in the second field SF2 and the third field SF3.

In particular, in the third field SF3, sub-pixels SP may be distorted or saturated due to various causes such as chief ray angle (CRA) of incident lights not matching each other. Even though a distorted sub-pixel SP is present in sub-pixels SP corresponding to the third micro lens 131-3, a disparity of higher accuracy may be calculated based on the image data IDAT generated from the remaining sub-pixels SP other than the distorted sub-pixel SP. Accordingly, the autofocus performance may be improved in the third field SF3.

An example where the pixel array 130 is divided into the first field SF1, the second field SF2, and the third field SF3 is described with reference to FIGS. 3 and 4, but embodiments are not limited thereto. For example, the pixel array 130 may be divided into the various numbers of fields depending on the MTF of the lens 110.

In example embodiments, the structure of pixel array 130 is described where the pixel array 130 is divided into three fields SF1 to SF3 and one sub-pixel includes two photoelectric conversion elements, but embodiments are not limited thereto.

Figure 5:
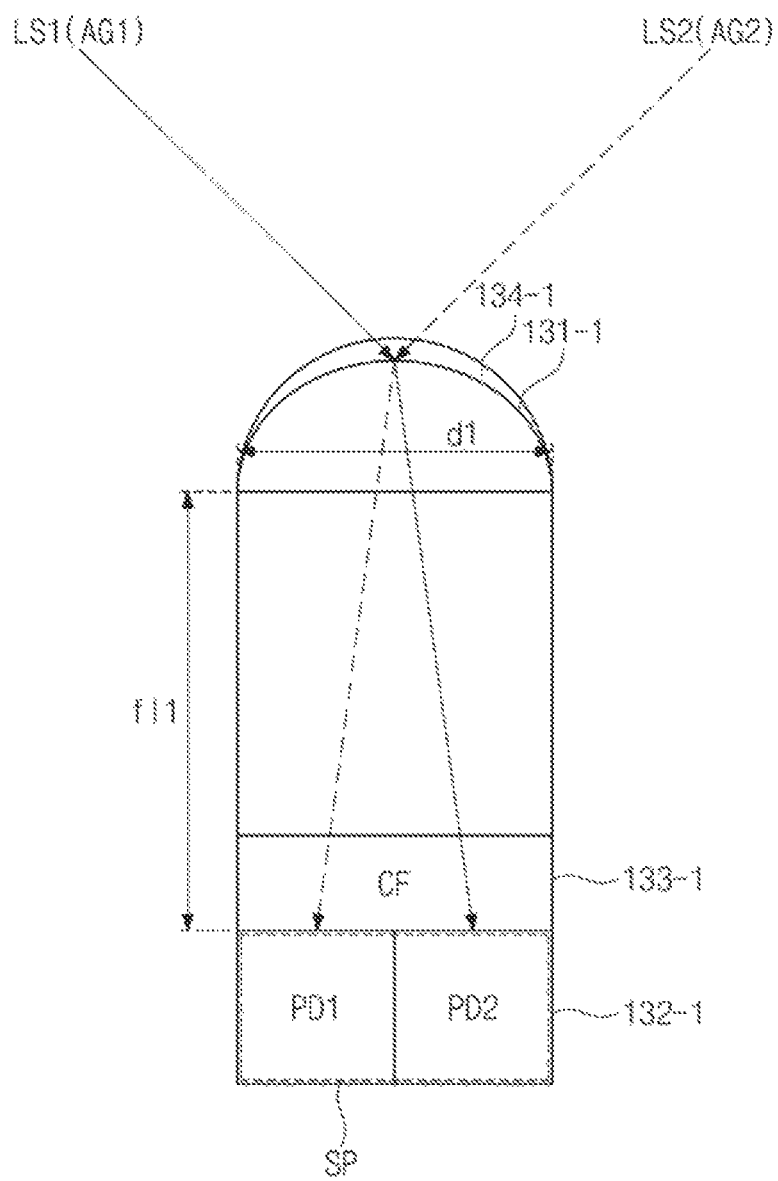
FIG. 5 is a cross-sectional view of a first part of a pixel array corresponding to a first field taken along a line I-I' of FIG. 3.

FIG. 5 is a cross-sectional view of a first part of a pixel array corresponding to a first field taken along a line I-I' of FIG. 3. Referring to FIG. 5, the first part of the pixel array 130 corresponding to the first field SF1 may include the micro lens 131-1, the sub-pixel group 132-1, and a color filter 133-1. The color filter 133-1 may be disposed on or above the sub-pixel group 132-1. For example, the color filter 133-1 may be disposed directly on the sub-pixel group 132-1, or another material may be interposed between the color filter 133-1 and the sub-pixel group 132-1. The micro lens 131-1 may be disposed above the color filter 133-1. For example, the micro lens 131-1 may be spaced apart from the sub-pixel group 132-1 at an interval based on a focal distance f11 of the micro lens 131-1. Another material may be interposed between the micro lens 131-1 and the color filter 133-1.

The sub-pixel group 132-1 may include one sub-pixel SP. The sub-pixel group 132-1 may include a first photoelectric conversion element PD1 and a second photoelectric conversion element PD2. Each of the first photoelectric conversion element PD1 and the second photoelectric conversion element PD2 may convert a light signal converged through the color filter 133-1 into an electrical signal. For example, each of the first photoelectric conversion element PD1 and the second photoelectric conversion element PD2 may be implemented with a photodiode, a photo transistor, a photo gate, etc.

The color filter 133-1 may be one of color filters of a color filter array forming a certain pattern such as a Bayer pattern. For example, the color filter 133-1 may be one of a red filter, a green filter, and a blue filter, but embodiments are not limited thereto.

The diameter d1 of the micro lens 131-1 may be determined based on the corresponding sub-pixel group 132-1. For example, the diameter d1 of the micro lens 131-1 may be the same as a width or depth length of one sub-pixel SP.

The focal distance f11 of the micro lens 131-1 may be determined based on an f-number (or a focal ratio) of the lens 110. For example, the focal distance f11 may be determined such that the f-number of the micro lens 131-1 and the f-number of the lens 110 coincide with each other. The f-number of the micro lens 131-1 may be calculated based on the diameter d1 and the focal distance f11. Accordingly, the focal distance f11 may be determined depending on the diameter d1 that is in advance determined based on the sub-pixel group 132-1. When the f-number of the micro lens 131-1 and the f-number of the lens 110 coincide with each other, the performance of the micro lens 131-1 may be improved.

A curvature of the micro lens 131-1 may be determined such that a focal plane of the micro lens 131-1 is formed on the sub-pixel group 132-1. For example, the focal plane of the micro lens 131-1 may be determined based on the curvature and the focal distance f11. Accordingly, the curvature of the micro lens 131-1 may be determined depending on the focal distance f11 that is determined in advance based on the f-number of the lens 110.

A coating layer 134-1 that is formed of a material having a different refractive index from the micro lens 131-1 may be formed on a surface of the micro lens 131-1. When the coating layer 134-1 is formed on the surface of the micro lens 131-1, lights incident onto the micro lens 131-1 may be refracted at the surface of the micro lens 131-1. For example, the first light LS1 incident at a first angle AG1 and the second light LS2 incident at a second angle AG2 may be refracted at the surface of the micro lens 131-1 and may be converged on the sub-pixel group 132-1.

As illustrated in FIG. 5, when the sub-pixel group 132-1 may include two photoelectric conversion elements PD1 and PD2, lights incident from a left side of the micro lens 131-1 may be converged on the second photoelectric conversion element PD2, and lights incident from a right side of the micro lens 131-1 may be converged on the first photoelectric conversion element PD1. For example, the first light LS1 may be converged on the second photoelectric conversion element PD2, and the second light LS2 may be converged on the first photoelectric conversion element PD1.

As described above, because a micro lens of the first field SF1 corresponds to two photoelectric conversion elements, the first part of the pixel array 130 corresponding to the first field SF1 may have a structure in which lights incident onto each micro lens are able to be separated at two angles. In this case, the phase detection autofocus may be performed based on the image data IDAT generated from two photoelectric conversion elements.

Figure 6:
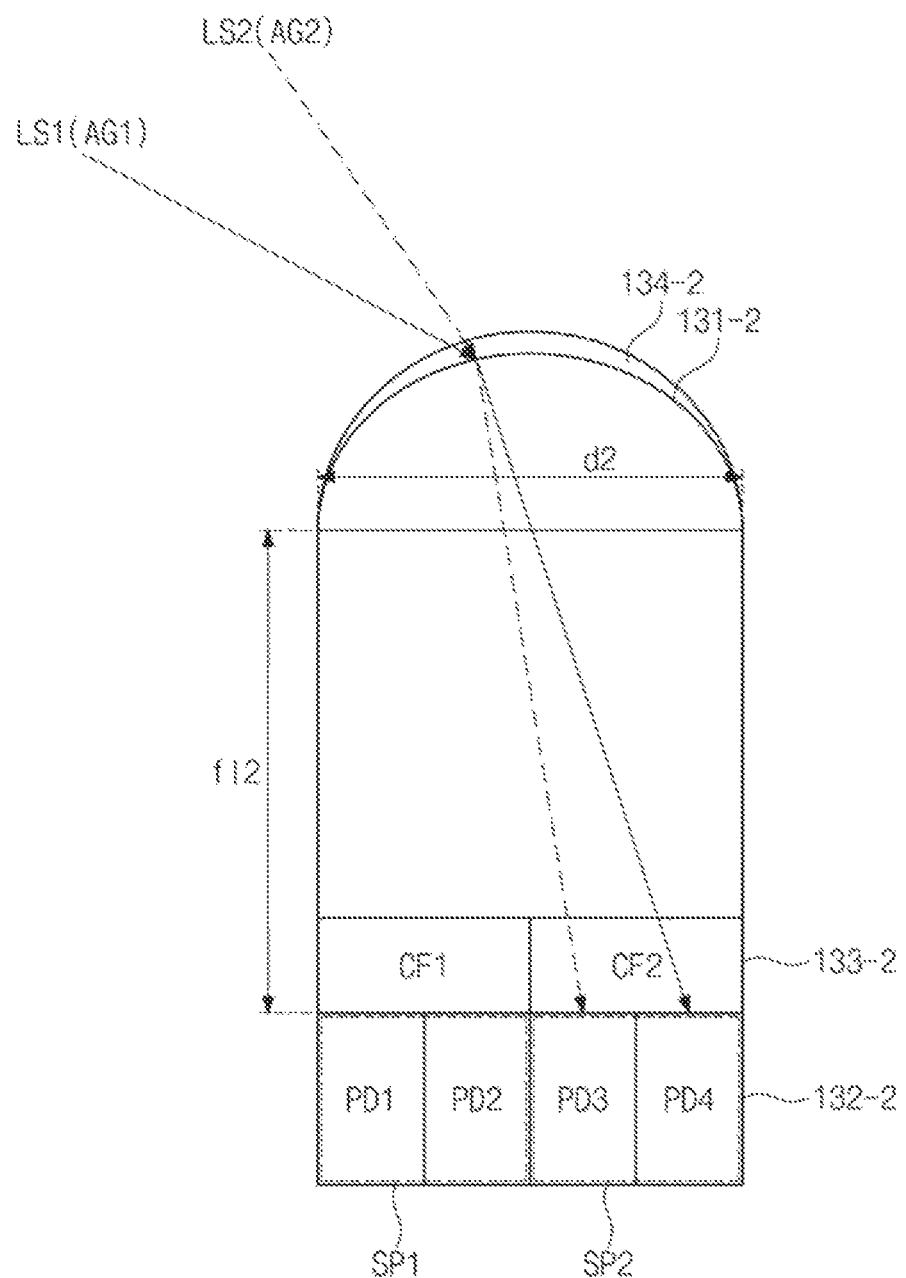
FIG. 6 is a cross-sectional view of a second part of a pixel array corresponding to a second field taken along a line II-II' of FIG. 3.

FIG. 6 is a cross-sectional view of a second part of a pixel array corresponding to a second field taken along a line II-IF of FIG. 3. Referring to FIG. 6, the second part of the pixel array 130 corresponding to the second field SF2 may include the micro lens 131-2, the sub-pixel group 132-2, and color filters 133-2. A structure of the second part of the pixel array 130 corresponding to the second field SF2 is similar to the structure of the first part of the pixel array 130 corresponding to the first field SF1.

The sub-pixel group 132-2 may include 4 sub-pixels SP (2×2 sub-pixels SP) as described with reference to FIG. 3. Each of the sub-pixels SP may include two photoelectric conversion elements. For example, a first sub-pixel SP1 may include a first photoelectric conversion element PD1 and a second photoelectric conversion element PD2, and a second sub-pixel SP2 may include a third photoelectric conversion element PD3 and a fourth photoelectric conversion element PD4. In this case, each of the first photoelectric conversion element PD1, the second photoelectric conversion element PD2, the third photoelectric conversion element PD3, and the fourth photoelectric conversion element PD4 may convert a light signal converged through the corresponding color filter into an electrical signal. Operations of sub-pixels SP that are not illustrated in FIG. 6 may be similar to operations of the first and second sub-pixels SP1 and SP2.

The color filters 133-2 may correspond to the sub-pixels of the sub-pixel group 132-2, respectively. For example, a first color filter CF1 may be disposed to correspond to the first sub-pixel SP1 and a second color filter CF2 may be disposed to correspond to the second sub-pixel SP2.

The color filters 133-2 may be the same or may be different. For example, each of the first color filter CF1 and a second color filter CF2 may be a red filter. As another example, the first color filter CF1 may be a red filter, and the second color filter CF2 may be a green filter.

The diameter d2 of the micro lens 131-2 may be determined based on the corresponding sub-pixel group 132-2. For example, the diameter d2 of the micro lens 131-2 may be the same as a total width or depth length of the first sub-pixel SP1 and the second sub-pixel SP2.

A focal distance f12 of the micro lens 131-2 may be determined based on an f-number (or a focal ratio) of the lens 110. For example, the focal distance f12 may be determined such that the f-number of the micro lens 131-2 and the f-number of the lens 110 coincide with each other. The f-number of the micro lens 131-2 may be calculated by the diameter d2 and the focal distance f12. Accordingly, the focal distance f12 may be determined depending on the diameter d2 that is determined in advance based on the sub-pixel group 132-2. When the f-number of the micro lens 131-2 and the f-number of the lens 110 coincide with each other, the performance of the micro lens 131-2 may be improved.

A curvature of the micro lens 131-2 may be determined such that a focal plane of the micro lens 131-2 is formed on the sub-pixel group 132-2. For example, the focal plane of the micro lens 131-2 may be determined based on the curvature and the focal distance f12. Accordingly, the curvature of the micro lens 131-2 may be determined depending on the focal distance f12 that is determined in advance based on the f-number of the lens 110.

A coating layer 134-2 that is formed of a material having a different refractive index from the micro lens 131-2 may be formed on a surface of the micro lens 131-2. When the coating layer 134-2 is formed on the surface of the micro lens 131-2, lights incident onto the micro lens 131-2 may be refracted at the surface of the micro lens 131-2. For example, the first light LS1 incident at the first angle AG1 and the second light LS2 incident at the second angle AG2 may be refracted at the surface of the micro lens 131-2 and may be converged on the sub-pixel group 132-2.

As illustrated in FIG. 6, when the sub-pixel group 132-2 includes the first to fourth photoelectric conversion elements PD1 to PD4, lights incident from a left side of the micro lens 131-2 may be converged on the third photoelectric conversion element PD3 or the fourth photoelectric conversion element PD4 depending incident angles, and lights incident from a right side of the micro lens 131-2 may be converged on the first photoelectric conversion element PD1 or the second photoelectric conversion element PD2 depending on incident angles. For example, the first light LS1 may be converged on the fourth photoelectric conversion element PD4, and the second light LS2 may be converged on the third photoelectric conversion element PD3.

As described above, because a micro lens of the second field SF2 corresponds to 8 photoelectric conversion elements, the second part of the pixel array 130 corresponding to the second field SF2 may have a structure in which lights incident onto each micro lens are able to be separated at 8 angles. In this case, the phase detection autofocus may be improved based on the image data IDAT generated from 8 photoelectric conversion elements.

Figure 7:
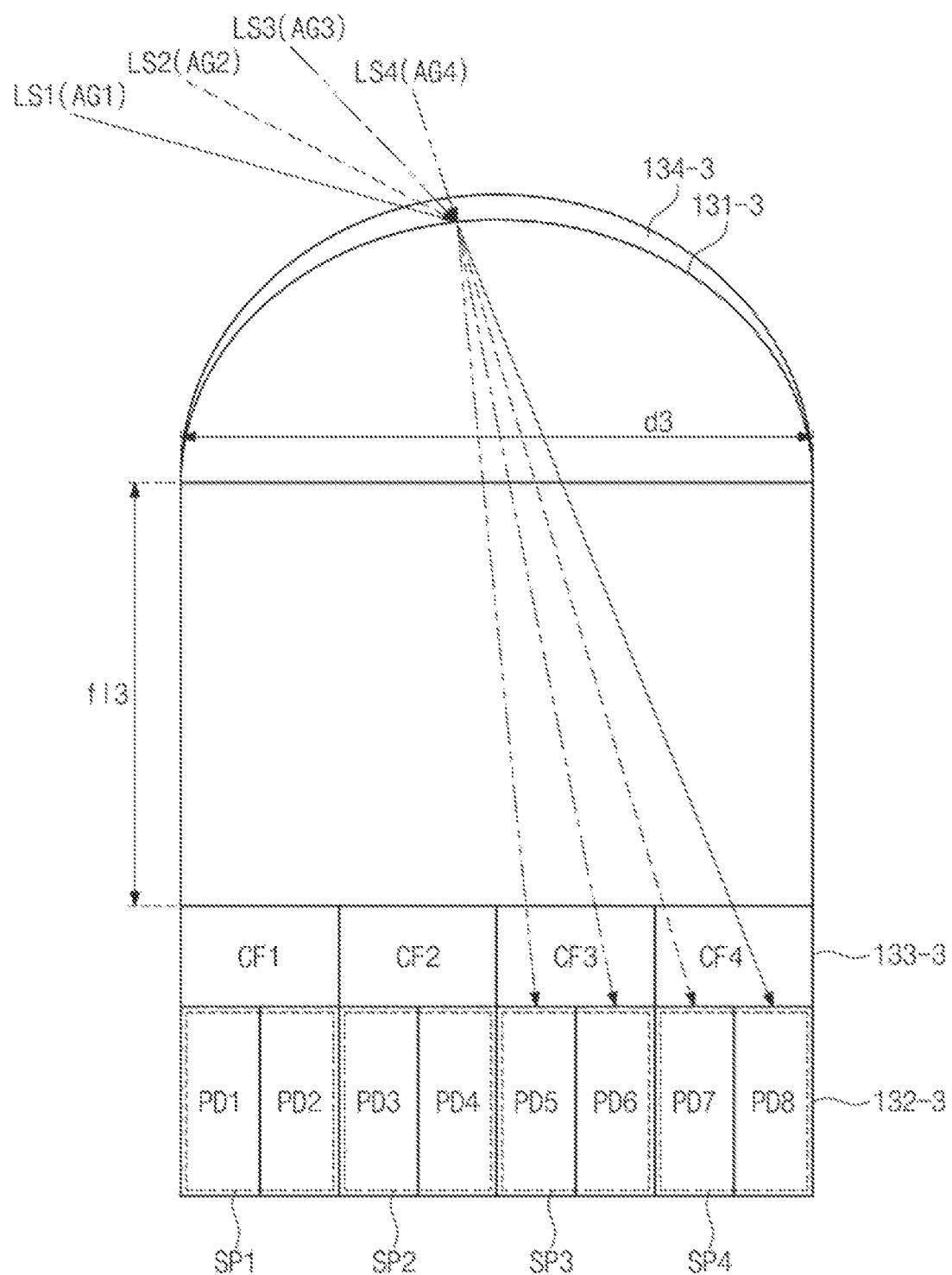
FIG. 7 is a cross-sectional view of a third part of a pixel array corresponding to a third field taken along a line of FIG. 3.

FIG. 7 is a cross-sectional view of a third part of a pixel array corresponding to a third field taken along a line III-III' of FIG. 3. Referring to FIG. 7, the third part of the pixel array 130 corresponding to the third field SF3 may include the micro lens 131-3, the sub-pixel group 132-3, and color filters 133-3. A structure of the third part of the pixel array 130 corresponding to the third field SF3 is similar to the structure of the second part of the pixel array 130 corresponding to the second field SF2.

The sub-pixel group 132-3 may include 16 sub-pixels SP (4×4 sub-pixels SP) as described with reference to FIG. 3. Each of the sub-pixels SP may include two photoelectric conversion elements. For example, a first sub-pixel SP1 may include a first photoelectric conversion element PD1 and a second photoelectric conversion element PD2, and a second sub-pixel SP2 may include a third photoelectric conversion element PD3 and a fourth photoelectric conversion element PD4. A third sub-pixel SP3 may include a fifth photoelectric conversion element PD5 and a sixth photoelectric conversion element PD6, and a fourth sub-pixel SP4 may include a seventh photoelectric conversion element PD7 and an eighth photoelectric conversion element PD8. In this case, each of the first to eighth photoelectric conversion elements PD1 to PD8 may convert a light signal converged through the corresponding color filter into an electrical signal. Operations of sub-pixels SP that are not illustrated in FIG. 7 may be similar to operations of the first and fourth sub-pixels SP1 to SP4.

The diameter d3 of the micro lens 131-3 may be determined based on the corresponding sub-pixel group 132-3. For example, the diameter d3 of the micro lens 131-3 may be the same as a total width or depth length of the first sub-pixel SP1, the second sub-pixel SP2, the third sub-pixel SP3, and the fourth sub-pixel SP4.

A focal distance f13 of the micro lens 131-3 may be determined based on an f-number (or a focal ratio) of the lens 110. For example, the focal distance f13 may be determined such that the f-number of the micro lens 131-3 and the f-number of the lens 110 coincide with each other. The f-number of the micro lens 131-3 may be calculated by the diameter d3 and the focal distance f13. Accordingly, the focal distance f13 may be determined depending on the diameter d3 that is determined in advance based on the sub-pixel group 132-3. When the f-number of the micro lens 131-3 and the f-number of the lens 110 coincide with each other, the performance of the micro lens 131-3 may be improved.

A curvature of the micro lens 131-3 may be determined such that a focal plane of the micro lens 131-3 is formed on the sub-pixel group 132-3. For example, the focal plane of the micro lens 131-3 may be determined based on the curvature and the focal distance f13. Accordingly, the curvature of the micro lens 131-3 may be determined depending on the focal distance f13 that is determined in advance based on the f-number of the lens 110.

A coating layer 134-3 that is formed of a material having a different refractive index from the micro lens 131-3 may be formed on a surface of the micro lens 131-3. When the coating layer 134-3 is formed on the surface of the micro lens 131-3, lights incident onto the micro lens 131-3 may be refracted at the surface of the micro lens 131-3. For example, the first light LS1, the second light LS2, the third light LS3, and the fourth light LS4 incident at the first angle AG1, the second angle AG2, the third angle AG3, and the fourth angle AG4, respectively, may be refracted at the surface of the micro lens 131-3 and may be converged on the sub-pixel group 132-3.

As illustrated in FIG. 7, when the sub-pixel group 132-3 includes the first to eighth photoelectric conversion elements PD1 to PD8, lights incident from a left side of the micro lens 131-3 may be converged on one of the fifth to eighth photoelectric conversion elements PD5 to PD8 depending incident angles, and lights incident from a right side of the micro lens 131-3 may be converged on one of the first to fourth photoelectric conversion elements PD1 to PD4 depending on an incident angle. For example, the first light LS1 may be converged on the eighth photoelectric conversion element PD8, and the second light LS2 may be converged on the seventh photoelectric conversion element PD7. The third light LS3 may be converged on the sixth photoelectric conversion element PD6, and the fourth light LS4 may be converged on the fifth photoelectric conversion element PD5.

As described above, because a micro lens of the third field SF3 corresponds to 32 photoelectric conversion elements, the third part of the pixel array 130 corresponding to the third field SF3 may have a structure in which lights incident onto each micro lens are able to be separated at 32 angles. In this case, the phase detection autofocus may be performed based on the image data IDAT generated from 32 photoelectric conversion elements.

As described above, the pixel array 130 corresponding to the first field SF1, the second field SF2, and the third field SF3 may be configured such that the f-number of the micro lenses 131-1 to 131-3 and the f-number of the lens 110 coincide with each other. In this case, because the diameters d1 to d3 of the micro lenses 131-1 to 131-3 are different, the focal distances f11 to f13 of the micro lenses 131-1 to 131-3 may be different. For example, the focal distance f13 of the micro lens 131-3 may be longer than the focal distance f11 of the micro lens 131-1. Accordingly, intervals between the micro lenses 131-1 to 131-3 and the sub-pixel groups 132-1 to 132-3 may be different. However, embodiments are not limited thereto. For example, intervals between the micro lenses 131-1 to 131-3 of pixels PX1 to PX3 and the sub-pixel groups 132-1 to 132-3 may be the same. In this case, the f-number of the micro lenses 131-1 to 131-3 and the f-number of the lens 110 do not coincide with each other.

Also, curvatures of the micro lenses 131-1 to 131-3 may be different such that focal planes of the micro lenses 131-1 to 131-3 are formed at the sub-pixel groups 132-1 to 132-3 in the sub-pixel array 132.

Figure 8:
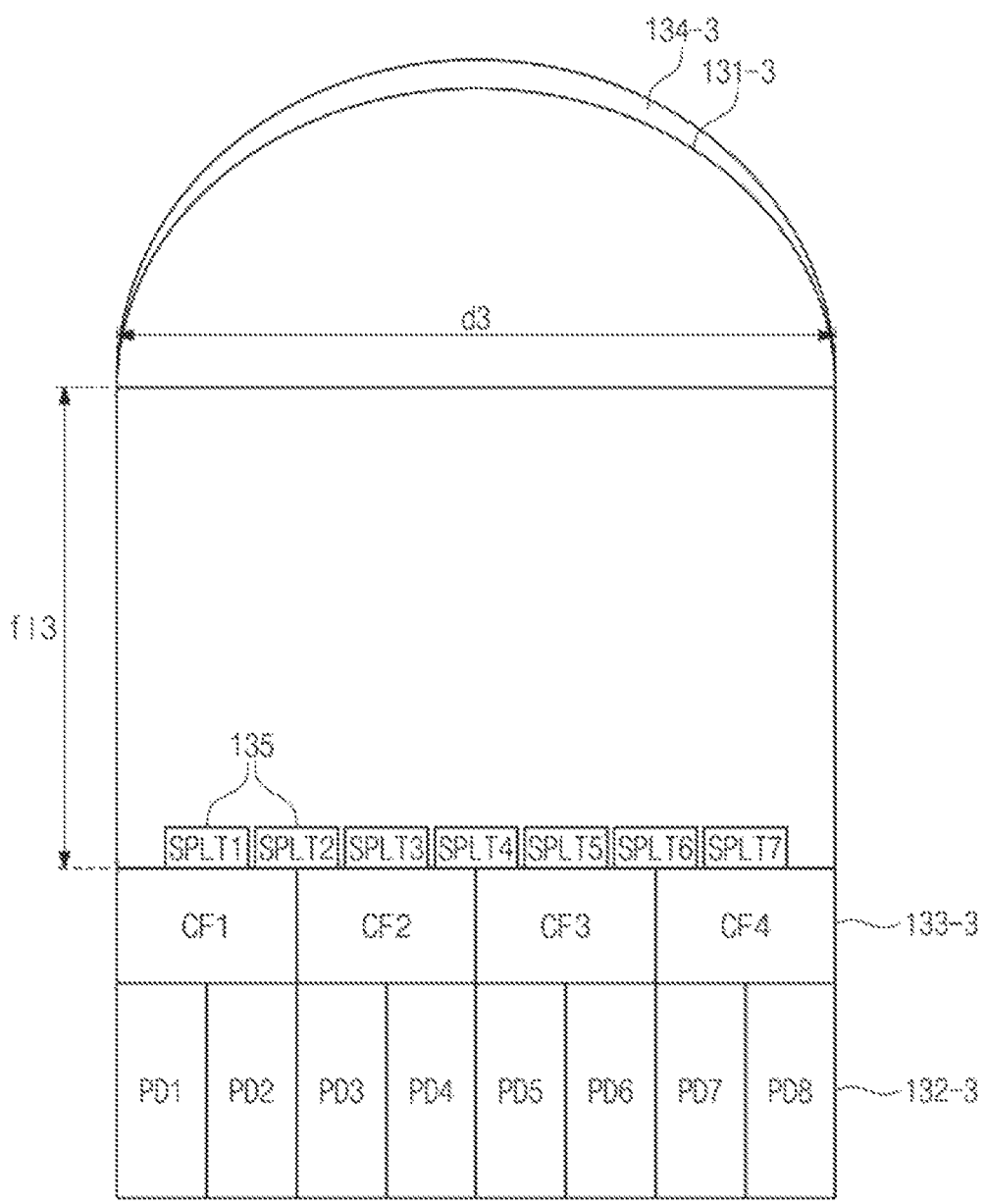
FIG. 8 is another example of a third part of a pixel array corresponding to a third field taken along a line of FIG. 3.

FIG. 8 is another example of a third part of a pixel array corresponding to a third field taken along a line III-III' of FIG. 3. Referring to FIG. 8, the third part of the pixel array 130 corresponding to the third field SF3 may include the micro lens 131-3 on which a coating film 134-3 is formed, the sub-pixel group 132-3, the color filters 133-3, and a plurality of splitters 135. The splitters 135 may be disposed on the color filters 133-3. In this case, the splitters 135 may be disposed directly on the color filters 133-3, or another material may be interposed between the splitters 135 and the color filters 133-3.

Each of the splitters 135 may be disposed above a boundary between two photoelectric conversion elements. For example, a first splitter SPLT1 may be disposed above a boundary between the first photoelectric conversion element PD1 and the second photoelectric conversion element PD2, and a second splitter SPLT2 may be disposed above a boundary between the second photoelectric conversion element PD2 and the third photoelectric conversion element PD3.

Each of the splitters 135 may distribute a light converged above a boundary between two photoelectric conversion elements into at least one of the two photoelectric conversion elements. For example, the first splitter SPLT1 may transmit a light converged above the boundary between the first photoelectric conversion element PD1 and the second photoelectric conversion element PD2 into at least one of the first photoelectric conversion element PD1 and the second photoelectric conversion element PD2.

As illustrated in FIG. 8, when the splitters 135 are disposed in the pixel array 130, lights incident from the micro lens 131-3 may be more clearly separated depending on angles and may be converged on the photoelectric conversion elements PD1 to PD8. Accordingly, the accuracy of a disparity that is calculated based on the image data IDAT generated from the photoelectric conversion elements PD1 to PD8 may be relatively high.

An example where the splitters 135 are implemented in the third field SF3 of the pixel array 130 is illustrated in FIG. 8, but embodiments are not limited thereto. For example, splitters may be implemented in the first field SF1 and the second field SF2 of the pixel array 130.

Figure 9:
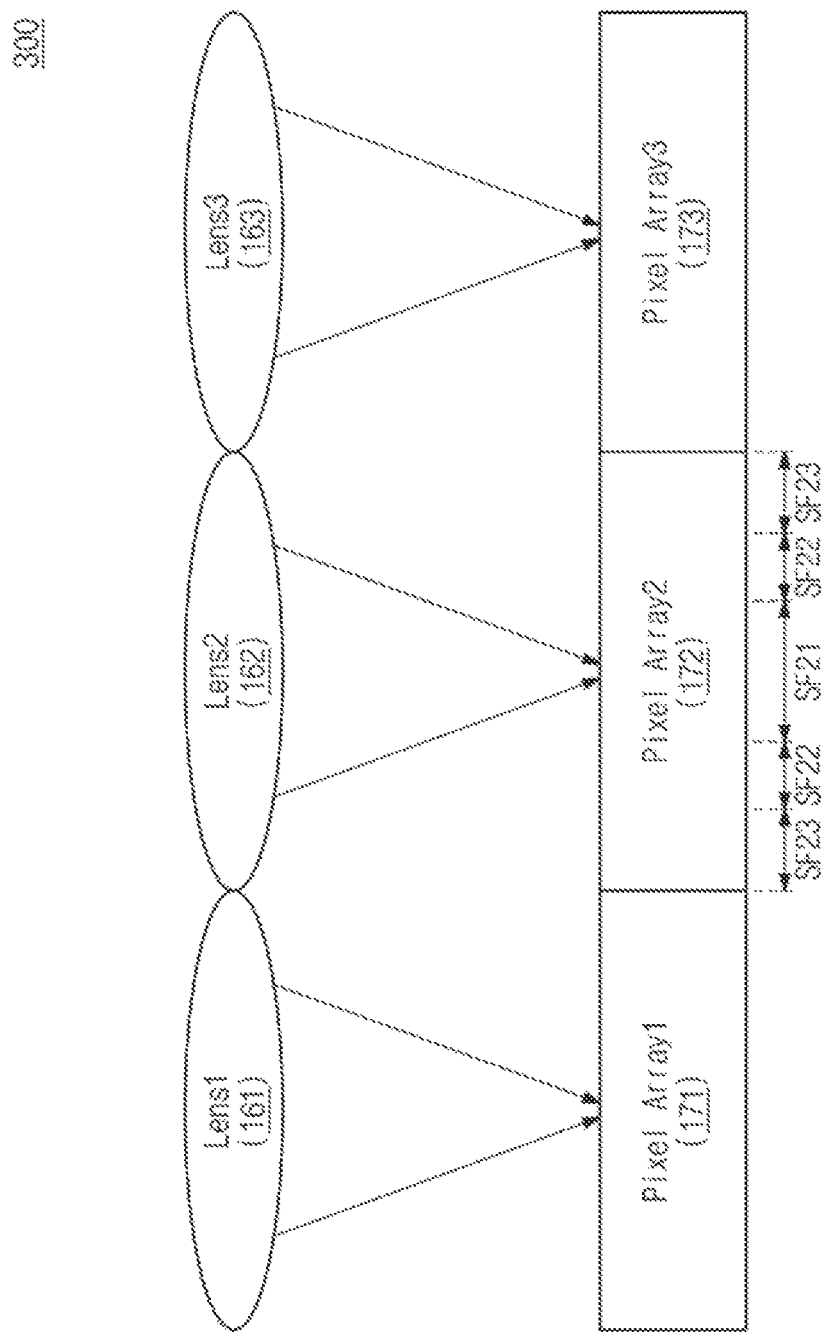
FIG. 9 is a diagram illustrating an image device according to another example embodiment.

FIG. 9 is a diagram illustrating an image device according to another example embodiment. Referring to FIG. 9, an image device 300 may include a first lens 161, a second lens 162, and a third lens 163 and a first pixel array 171, a second pixel array 172, and a third pixel array 173. The first lens 161, the second lens 162, and the third lens 163 may correspond to the first pixel array 171, the second pixel array 172, and the third pixel array 173, respectively. For example, lights passing through the first lens 161 may be converged on the first pixel array 171, and lights passing through the second lens 162 may be converged on the second pixel array 172, and lights passing through the third lens 163 may be converged on the third pixel array 173.

Each of the first pixel array 171, the second pixel array 172, and the third pixel array 173 may be divided into a plurality of fields depending on the MTF, as described with reference to FIGS. 3 and 4. For example, the second pixel array 172 may be divided into a first field SF21, a second field SF22, and a third field SF23 depending on the MTF.

As described with reference to FIGS. 1 to 8, when each of the first pixel array 171, the second pixel array 172, and the third pixel array 173 is divided into a plurality of fields, different fields of each pixel array may include micro lenses of different sizes. In this case, the autofocus performance may be improved in all of the image regions corresponding to the first pixel array 171, the second pixel array 172, and the third pixel array 173. For example, the autofocus performance may be improved in an image region corresponding to the third field SF23 of the second pixel array 172.

When the autofocus is performed based on each of the first pixel array 171, the second pixel array 172, and the third pixel array 173, locations of lenses respectively corresponding to the first pixel array 171, the second pixel array 172, and the third pixel array 173 may be independently adjusted. For example, when the autofocus is performed based on the first pixel array 171, a location of the first lens 161 may be adjusted, and when the autofocus is performed based on the second pixel array 172, a location of the second lens 162 may be adjusted.

The first lens 161, the second lens 162, and the third lens 163 and the first pixel array 171, the second pixel array 172, and the third pixel array 173 are illustrated in FIG. 9, but embodiments are not limited thereto. For example, the number of lenses included in the image device 300 and the number of corresponding pixel arrays to the lenses may be variously determined.

Figure 10:
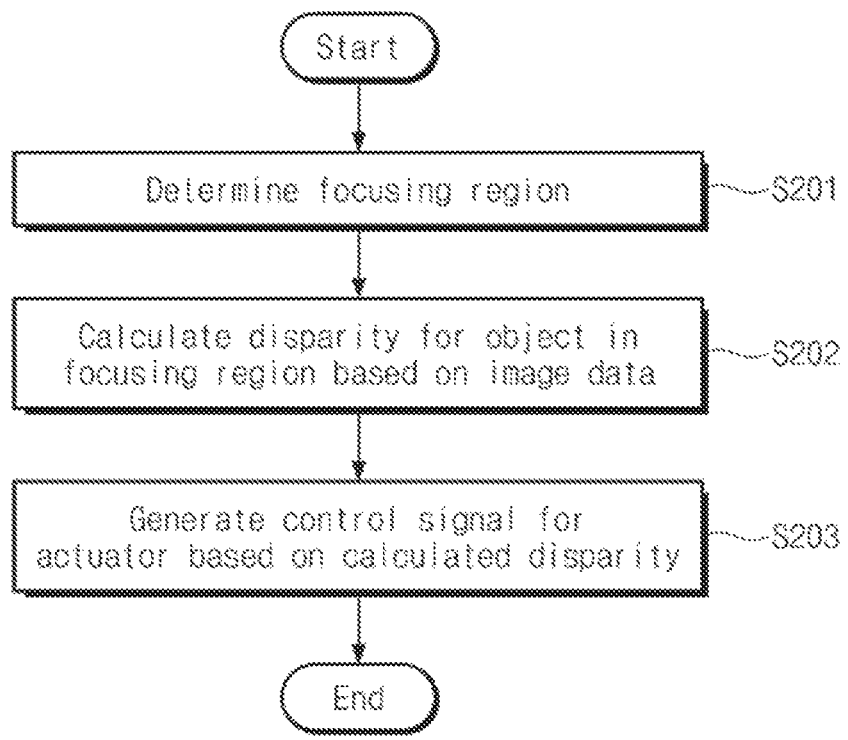
FIG. 10 is a flowchart illustrating an example operation of an image signal processor of FIG. 1 for an autofocus according to an example.

FIG. 10 is a flowchart illustrating an example operation of an image signal processor of FIG. 1 for an autofocus according to an example. Referring to FIGS. 1 and 10, in operation S201, the image signal processor 200 may determine a focusing region. The image signal processor 200 may determine a part of a region of a photographed image as the focusing region. In an example embodiment, the image signal processor 200 may determine the focusing region from a user input or may determine the focusing region based on object information of an image. For example, the image signal processor 200 may recognize objects of the image based on the image data IDAT provided from the image sensor 120. When a face of objects in the image is recognized, the image signal processor 200 may determine a portion of the region, in which the face is included, as the focusing region.

In operation S202, the image signal processor 200 may calculate a disparity with respect to the object of the focusing region based on the image data IDAT. For example, the image signal processor 200 may calculate a disparity based on the image data IDAT generated from sub-pixels corresponding to the focusing region.

In operation S203, the image signal processor 200 may generate the control signal CTRL for the actuator 150 based on the calculated disparity. The actuator 150 may adjust a location of the lens 110 in response to the generated control signal CTRL. As such, the autofocus may be performed on the focusing region.

Figure 11:
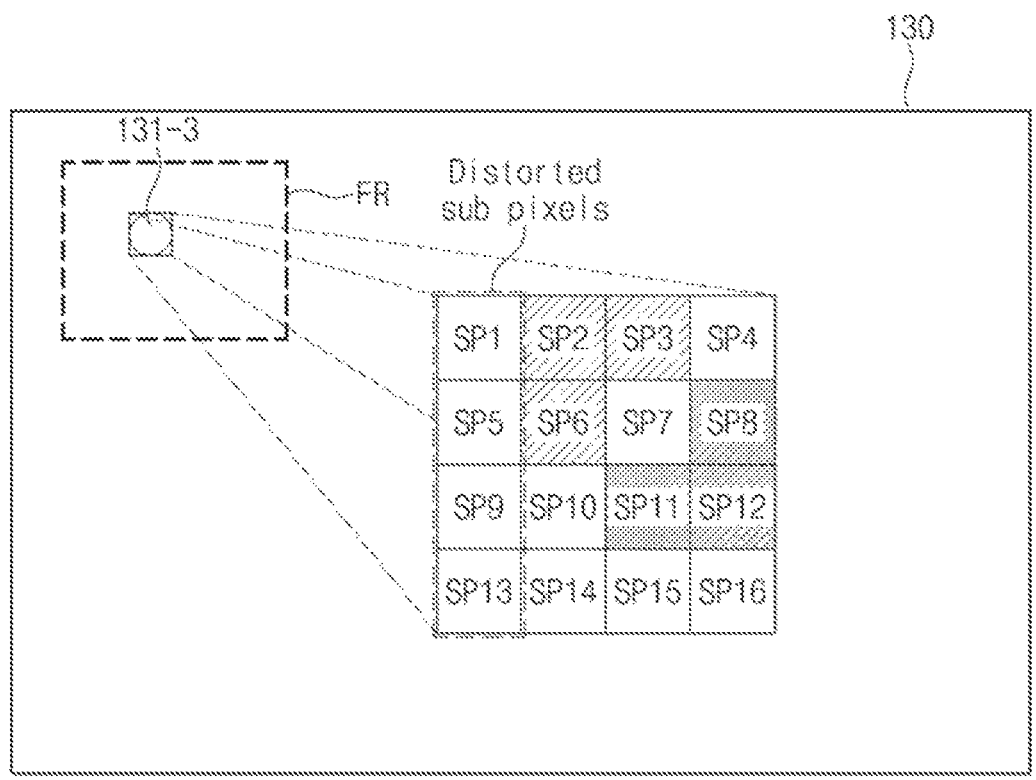
FIG. 11 is a diagram illustrating an example in which an image signal processor calculates a disparity according to an example embodiment.

FIG. 11 is a diagram illustrating an example in which an image signal processor calculates a disparity according to an example embodiment. Referring to FIGS. 1 and 11, the image signal processor 200 may determine a focusing region FR. For example, a location of the focusing region FR may correspond to a peripheral portion such as the third field SF3 of FIG. 3 of the pixel array 130.

In the case of the focusing region FR of the pixel array 130, one micro lens 131-3 may correspond to 16 sub-pixels SP1 to SP16. The sub-pixels SP1 to SP16 may correspond to 16 different pupils of the lens 110, respectively. In the case where each of the sub-pixels SP1 to SP16 includes one photoelectric conversion element, the image data IDAT obtained in 16 different directions may be generated in the focusing region FR.

In the peripheral portion of the pixel array 130, sub-pixels SP1, SP5, SP9, and SP13 of the sub-pixels SP1 to SP16 may be distorted or saturated due to various causes such as CRA of lights not matching. The image signal processor 200 may determine in advance the distorted sub-pixels SP1, SP5, SP9, and SP13 of the sub-pixels SP1 to SP16. The image signal processor 200 may calculate a disparity based on the remaining sub-pixels of the sub-pixels SP1 to SP16 other than the distorted sub-pixels SP1, SP5, SP9, and SP13. For example, the image signal processor 200 may calculate a disparity by comparing an average value of the image data IDAT generated from the sub-pixels SP2, SP3, and SP6 and an average value of the image data IDAT generated from the sub-pixels P8, SP11, and SP12.

In an example embodiment, the image signal processor 200 may determine sub-pixels for calculating a disparity based on a shape of an object in the focusing region FR. As illustrated in FIG. 11, when a plurality of sub-pixels SP1 to SP16 for calculating a disparity are present in the focusing region FR, the image signal processor 200 may determine sub-pixels for calculating a disparity in various methods depending on a shape of an object. As such, the image signal processor 200 may calculate a disparity, the accuracy of which is high, with respect to objects having various shapes.

When an optical axis center of the lens 110 moves, to separate lights incident onto a peripheral portion such as the third field SF3 of FIG. 3 of the pixel array 130 depending on angles may be more difficult than in a central portion such as the first field SF1 of FIG. 3 of the pixel array 130. However, as illustrated in FIG. 11, in the case of separating incident lights based on the plurality of sub-pixels SP1 to SP16, lights incident at different angles may be separated. Accordingly, the image signal processor 200 may calculate a disparity, the accuracy of which is relatively high, based on the image data IDAT generated from the sub-pixels SP1 to SP16.

As described above, the image sensor 120 may include the pixel array 130 in which there are implemented micro lenses, the sizes of which are differently determined depending on fields. According to the pixel array 130 of example embodiments, lights incident onto the peripheral portion of the pixel array 130 may be more finely separated depending on incident angles of the lights. Accordingly, the accuracy of a disparity calculated based on the image data IDAT generated from the peripheral portion may be high, and the autofocus performance may be improved.

Figure 12:
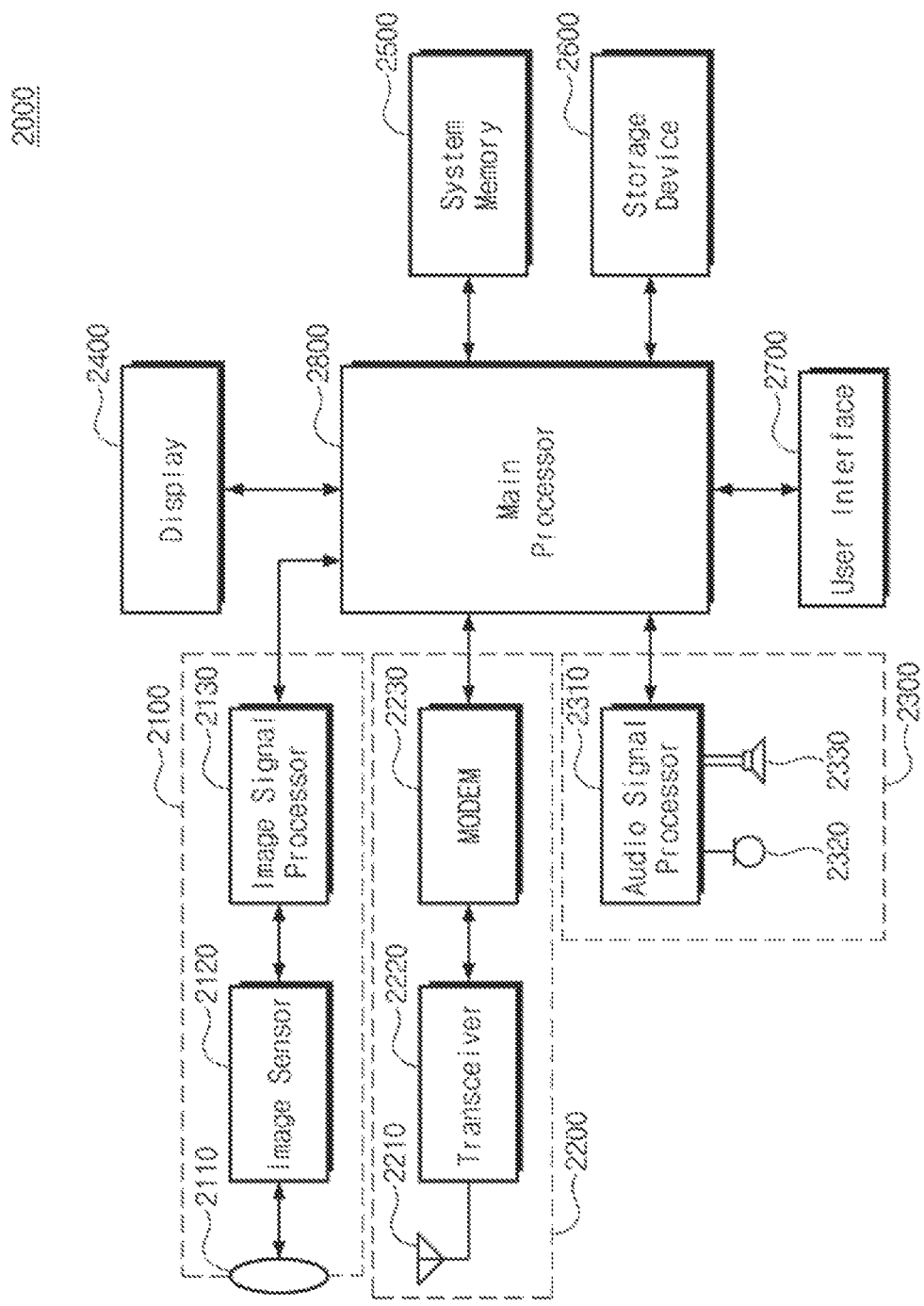
FIG. 12 is a block diagram illustrating an electronic device to which an image system according to an example embodiment.

FIG. 12 is a block diagram illustrating an electronic device to which an image system according to an example embodiment is applied. Referring to FIG. 12, an electronic device 2000 may include an image processing block 2100, a communication interface 2200, an audio processing interface 2300, a display device 2400, a system memory 2500, a storage device 2600, a user interface 2700, and a main processor 2800. In an example embodiment, the electronic device 2000 may be one of various electronic devices such as a portable communication terminal, a personal digital assistant (PDA), a portable media player (PMP), a digital camera, a smartphone, a tablet computer, a laptop computer, and a wearable device.

The image processing block 2100 may receive a light through a lens 2110. An image sensor 2120 and an image signal processor 2130 included in the image processing block 2100 may generate image information about an external object based on the received light. In an example embodiment, the lens 2110, the image sensor 2120, and the image signal processor 2130 may be the lens 110, the image sensor 120, and the image signal processor 2130 described with reference to FIGS. 1 to 11 or may operate based on the method described with reference to FIGS. 1 to 11.

The communication interface 2200 may exchange signals with an external device/system through an antenna 2210. A transceiver 2220 and a modulator/demodulator (MODEM) 2230 of the communication interface 2200 may process signals exchanged with the external device/system in compliance with at least one of various wireless communication protocols such as long term evolution (LTE), worldwide interoperability for microwave access (WiMax), global system for mobile communication (GSM), code division multiple access (CDMA), Bluetooth, near field communication (NFC), wireless fidelity (Wi-Fi), and radio frequency identification (RFID).

The audio processing interface 2300 may process an audio signal by using an audio signal processor 2310. The audio processing interface 2300 may receive an audio input through a microphone 2320 or may provide an audio output through a speaker 2330.

The display device 2400 may receive data from an external device, for example, the main processor 2800, and may display an image through a display panel based on the receive data. In an example embodiment, the display device 2400 may display a focused image depending on the phase detection manner described with reference to FIGS. 1 to 11.

The system memory 2500 may store data used for an operation of the electronic device 2000. For example, the system memory 2500 may temporarily store data processed or to be processed by the main processor 2800. For example, the system memory 2500 may include a volatile memory such as a static random access memory (SRAM), a dynamic RAM (DRAM), or a synchronous DRAM (SDRAM), and/or a nonvolatile memory such as a phase-change RAM (PRAM), a magneto-resistive RAM (MRAM), a resistive RAM (ReRAM), or a ferroelectric RAM (FRAM).

The storage device 2600 may store data regardless of whether a power is supplied. For example, the storage device 2600 may include at least one of various nonvolatile memories such as a flash memory, a PRAM, an MRAM, a ReRAM, and a FRAM. For example, the storage device 2600 may include an embedded memory and/or a removable memory of the electronic device 2000.

The user interface 2700 may enable communication between a user and the electronic device 2000. In an example embodiment, the user interface 2700 may include input interfaces such as a keypad, a button, a touch screen, a touch pad, a gyroscope sensor, a vibration sensor, and an acceleration sensor. In an example embodiment, the user interface 2700 may include output interfaces such as a motor and an light-emitting diode (LED) lamp.

The main processor 2800 may control overall operations of the electronic device 2000. The main processor 2800 may control/manage operations of the components of the electronic device 2000. The main processor 2800 may process various operations for the purpose of operating the electronic device 2000. In an example embodiment, a part of the components of FIG. 12 may be implemented in the form of a system on chip and may be provided as an application processor (AP) of the electronic device 2000.

According to the example embodiments, there may be provided an image sensor capable of supporting a phase detection autofocus with respect to the entire image region.

Also, the image sensor according to the example embodiments may improve an autofocus performance of a peripheral portion by more clearly separating angles of lights incident onto the peripheral portion and receiving the lights.

While example embodiments have been described with reference to the figures, it will be understood by those of ordinary skill in the art that various changes in form and details may be made therein without departing from the spirit and scope as defined by the following claims.

What is claimed is:

1. An image sensor comprising:
a pixel array comprising a plurality of pixels; and
a micro lens array comprising a first micro lens of a first size provided in a first area of the pixel array and a second micro lens of a second size provided in a second area of the pixel array, the second size being different from the first size,
wherein the plurality of pixels of the pixel array are divided into a first pixel group configured to receive a first light transmitted through the first micro lens and a second pixel group configured to receive a second light transmitted through the second micro lens,
wherein a number of pixels in the first pixel group is greater than a number of pixels in the second pixel group,
wherein the micro lens array is configured to receive the first light and the second light through a module lens configured to receive an external light, and
wherein a first modulation transfer function (MTF) of the module lens corresponding to the first area is lower than a second MTF of the module lens corresponding to the second area.

2. The image sensor of claim 1, wherein the first size of the first micro lens is larger than the second size of the second micro lens.

3. The image sensor of claim 1, wherein a focal distance of the first micro lens is different from a focal distance of the second micro lens.

4. The image sensor of claim 3, wherein a curvature of the first micro lens is different from a curvature of the second micro lens.

5. The image sensor of claim 1, further comprising:
a coating layer disposed on a surface of the first micro lens and formed of a material having a refractive index different from a refractive index of the first micro lens.

6. The image sensor of claim 1, wherein the first micro lens is configured to receive the first light incident at a first angle and a third light incident at a second angle, and
wherein the plurality of pixels of the pixel array comprise:
a first pixel configured to generate a first electrical signal based on the first light transmitted through the first micro lens; and
a second pixel configured to generate a second electrical signal based on the third light transmitted through the first micro lens.

7. The image sensor of claim 6 further comprising a processor configured to calculate a disparity by comparing first image data based on the first electrical signal and second image data based on the second electrical signal, and configured to perform an autofocus based on the calculated disparity.

8. The image sensor of claim 1, wherein each of the plurality of pixels comprises two photoelectric conversion elements.

9. An image sensor comprising:
a micro lens array comprising a first micro lens having a first diameter and a second micro lens having a second diameter that is different from the first diameter; and a sub-pixel array comprising a first sub-pixel group configured to convert a first light signal transmitted through the first micro lens into a first electrical signal and a second sub-pixel group configured to convert a second light signal transmitted through the second micro lens into a second electrical signal, wherein the micro lens array is configured to receive the first light signal and the second light signal through a module lens configured to receive an external light, wherein the first micro lens is provided in a first area of the image sensor and the second micro lens is disposed in a second area of the image sensor, and wherein a first modulation transfer function (MTF) of the module lens corresponding to the first area is lower than a second MTF of the module lens corresponding to the second area.

10. The image sensor of claim 9, wherein a number of sub-pixels in the first sub-pixel group is greater than a number of sub-pixels in the second sub-pixel group.

11. The image sensor of claim 10, wherein the first diameter of the first micro lens is larger than the second diameter of the second micro lens.

12. The image sensor of claim 9, further comprising:
a splitter configured to distribute the first light signal transmitted through the first micro lens to one of sub-pixels of the first sub-pixel group.

13. An electronic device comprising:
a module lens configured to receive a first light incident at a first angle that is refracted from an external object and a second light incident at a second angle that is refracted from the external object;
an image sensor configured to generate first image data corresponding to the external object based on the first light transmitted through the module lens and to generate second image data corresponding to the external object based on the second light transmitted through the module lens; and
an image signal processor configured to generate a control signal to adjust a location of the module lens based on the first image data and the second image data, wherein the image sensor comprises micro lenses of different sizes configured to receive the first light and the second light, and wherein an f-number of the micro lenses is identical to an f-number of the module lens.

14. The electronic device of claim 13, wherein the image sensor further comprises a pixel array comprising a first pixel and a second pixel, wherein the first pixel is configured to generate a first electrical signal corresponding to the first image data based on the first light transmitted through a first micro lens of the micro lenses, and wherein the second pixel is configured to generate a second electrical signal corresponding to the second image data based on the second light transmitted through the first micro lens.

15. The electronic device of claim 13, wherein the image sensor further comprises a pixel array comprising a first pixel and a second pixel, wherein the first pixel comprises a first photoelectric conversion element and a second photoelectric conversion element, wherein the first photoelectric conversion element is configured to generate a first electrical signal corresponding to the first image data based on the first light transmitted through a first micro lens of the micro lenses, and wherein the second photoelectric conversion element is configured to generate a second electrical signal corresponding to the second image data based on the second light transmitted through the first micro lens.

16. The electronic device of claim 13, wherein the image signal processor is configured to calculate a disparity corresponding to the external object based on the first image data and the second image data, and to generate the control signal based on the calculated disparity.

* * * * *